United States Patent
Vartti et al.

(10) Patent No.: US 7,222,222 B1
(45) Date of Patent: May 22, 2007

(54) SYSTEM AND METHOD FOR HANDLING MEMORY REQUESTS IN A MULTIPROCESSOR SHARED MEMORY SYSTEM

(75) Inventors: Kelvin S. Vartti, Hugo, MN (US); Ross M. Weber, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 329 days.

(21) Appl. No.: 10/601,030

(22) Filed: Jun. 20, 2003

(51) Int. Cl.
*G06F 12/00* (2006.01)

(52) U.S. Cl. .................... 711/151; 711/158; 711/159

(58) Field of Classification Search ................ 711/130, 711/132, 141, 145, 147, 149, 150, 151, 152
See application file for complete search history.

(56) References Cited

U.S. PATENT DOCUMENTS

| 5,995,967 | A  | * | 11/1999  | Iacobovici et al. ........ 707/100 |
| 6,434,641 | B1 | * | 8/2002   | Haupt et al. ................... 710/54 |
| 6,546,465 | B1 | * | 4/2003   | Bertone ....................... 711/144 |
| 6,611,906 | B1 | * | 8/2003   | McAllister et al. .......... 711/168 |
| 6,820,086 | B1 | * | 11/2004  | Iacobovici et al. .......... 707/100 |
| 6,973,550 | B2 | * | 12/2005  | Rosenbluth et al. ......... 711/150 |

\* cited by examiner

*Primary Examiner*—Brian R. Peugh
(74) *Attorney, Agent, or Firm*—Beth L. McMahon; Charles A. Johnson; Richard J. Gregson

(57) ABSTRACT

A system and method are provided for tracking memory requests within a data processing system. The system includes a request tracking circuit that is coupled to receive requests for data from multiple processors. Multiple pending requests to the same memory address are tracked using a linked list. Only the oldest pending one of these multiple requests is issued to the memory. When data is returned from the memory, the requests are processed in an order determined by the linked list. That is, the data is provided to a processor associated with the oldest request. Thereafter, the data is retrieved and provided to the processor associated with the next request, and so on. A request issued by the memory soliciting the return of the data to the memory may also be added to the linked list to be processed in the foregoing manner.

18 Claims, 4 Drawing Sheets

SYSTEM AND METHOD FOR HANDLING MEMORY REQUESTS IN A MULTIPROCESSOR SHARED MEMORY SYSTEM

RELATED APPLICATIONS

The following applications of common assignee have some subject matter in common with the current application:

Ser. No. 10/600,880, now U.S. Pat. No. 7,065,614 entitled "System and Method for Ensuring Memory Coherency within a Multiprocessor Shared Memory System that Provides Data Ownership Prior to Invalidation", filed on even date herewith, and incorporated herein by reference in its entirety.

Ser. No. 10/600,205, now U.S. Pat. No. 6,973,548 entitled "Data Acceleration Mechanism for a Multiprocessor Shared Memory System", filed on even date herewith, and incorporated herein by reference in its entirety.

FIELD OF THE INVENTION

The present invention generally relates to methods and apparatus for use in a shared memory multiprocessor data processing system; and, more particularly, relates to an improved mechanism for managing memory requests in a system that includes multiple processing nodes coupled to a shared main memory.

DESCRIPTION OF THE PRIOR ART

Data processing systems are becoming increasing complex. Some systems, such as Symmetric Multi-Processor computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory or from other cache memories. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a data item is copied, and subsequently modified, within a cache memory, another IP requesting access to the same data item must be prevented from using the older copy of the data item stored either in main memory or the requesting IP's cache. This is referred to as maintaining cache coherency. Maintaining cache coherency becomes more difficult as more cache memories are added to the system since more copies of a single data item may have to be tracked.

Another problem related to that described above involves ensuring that a fair priority scheme is implemented which allows all processors to have relatively timely access to shared data. For example, consider the situation wherein data from the shared memory is copied to a first cache to allow one or more processors coupled to the cache to access this data. Before all of these processors have had the opportunity to access the data within the first cache, the first cache is forced to relinquish control over this data. This may occur because another processor that is coupled to a different cache requires access to the data. The data is therefore copied to this different cache only to be copied back to the first cache a short time later because the original processors still require access to the data. This repeated transfer of data, or "memory thrashing", decreases system throughput.

The problems associated with memory thrashing can be particularly evident where software locks are utilized. A software lock can be implemented by designating a location within shared memory as a lock cell that is used to control access to shared protected data. A processor cannot gain access to the protected data without first activating the software lock. This can be accomplished using an indivisible read-modify-write operation that tests the software lock for availability. If the lock is available, the lock cell data is set to a predetermined state to activate the lock. After the processor has completed reading and/or updating the protected data, the lock cell is deactivated, allowing another processor within the system to acquire the lock cell and access the protected data.

In a system wherein multiple processors are attempting to gain access to the same protected data, problems can exist when it is time to deactivate the lock cell. Assume, for example, that one or more processors are repeatedly testing the lock cell for availability, as may be performed within software looping constructs. Because these read requests are repeatedly being issued to test the state of the lock cell, it may not be possible for the processor that has activated the lock to readily gain access to the lock cell to deactivate the lock. This results in a temporary deadlock situation.

What is needed, therefore, if an improved system and method for managing requests within a multiprocessor shared memory system that addresses the foregoing issues.

SUMMARY OF THE INVENTION

A system and method are provided for tracking memory requests within a data processing system. The system includes a request tracking circuit that is coupled to receive requests for data from multiple processors. After a request is received and before it is forwarded to the memory for processing, a record is created within the request tracking circuit that stores request information. For example, this information may identify the request address, the processor that issued the request, as well as the request type. The request tracking circuit then determines whether any other requests are pending for the same memory address. If not, the request is forwarded to the memory. Otherwise, a request is not issued to memory, and instead, the newly-created record is associated with one or more other records tracking requests to the same address. In one embodiment, this association is created by forming a linked list of records. These records may be linked in an order that indicates the time-order in which the respective requests were received.

When data is received from memory as the result of a request, the data is forwarded to the processor that initiated the request. In one embodiment, the request tracking circuit then deletes the record for this request.

After a request is deleted from request tracking circuit, any additional request that is linked to this request is processed next as the current request. In particular, a request is issued to the processor that was most-recently provided the data. This request solicits the return of the data along with the return of any access rights (e.g., read-only or read/write access rights) that will be needed to fulfill the current request. In one embodiment, the request type that will be used to solicit return of the data is selected based on the access rights that were granted to the processor that most recently retained the data, and on the access rights that are being requested by the current request. The request type may further be based on the access rights that were granted by the memory for the data.

Following a request that solicits the return of data in the foregoing manner, any returned data is forwarded to the processor that issued the current request. In one embodiment, the request for, and the subsequent transfer of, the data to this processor is performed during an indivisible operation. This prevents some other processor or the memory itself from making an intervening request that intercepts the data. This mechanism thereby ensures that requests for data are processed in an order of receipt so that a temporary deadlock situation does not arise.

After the current request is processed, it may be deleted. Then, if the current request was linked to still another request, the next request in the linked list becomes the current request and is processed in the above-described manner. Processing continues until all requests within the linked list have been processed.

The foregoing system and method may be utilized in a system wherein multiple processing nodes are each coupled to the memory. Each processing node may include multiple processors having dedicated caches. Each of the processing nodes may further include a shared cache. Requests issued by the multiple processors of a processing node are tracked when requested data is not resident with the requested access rights within any of the caches in the processing node.

In the embodiment discussed in the foregoing paragraph, when a first processor is solicited for the return of data so that it can be provided to a next processor, the data may not be returned because the first processor already aged the data from its dedicated caches to the shared cache. If this is the case, data retrieved from the shared cache is returned to the next processor.

In yet another scenario, when data is aged from dedicated processor caches in the foregoing manner, a situation may arise wherein it is not possible to replace that data within the shared cache. In this situation, the data is transferred back to memory, and is therefore not available to be provided to the next processor. In one embodiment of the invention, the processor that issued the current request is prompted to re-issue that request so that the data is retrieved from memory in the manner discussed above.

According to one embodiment of the invention, the memory utilizes a dual memory channel architecture for providing requests to, and receiving requests from, the multiple processors. When this architecture is utilized, it may be possible for the memory to issue a request for return of data to the multiple processors while one or more of the multiple processors are requesting the same data from the memory. In this scenario, the request tracking circuit will be tracking one or more requests for this data that were issued by one of the multiple processors. When the request from memory is received, the request tracking circuit generates a record to track this memory request, which is then linked to the one or more requests for the same data in a manner similar to that described above. Eventually, the requested data will be provided by the memory, and the linked list of requests will be processed in the above-discussed manner. When the record storing the memory request is encountered, the data is retrieved from one of the multiple processors or shared cache, and is returned to the main memory.

According to one aspect of the invention, data may be provided by the memory as the result of a processor request before all coherency actions are performed for this data. For example, data may be provided by memory before other read-only copies of the data that are stored elsewhere within the data processing system are invalidated. In this case, the request tracking circuit tracks the outstanding invalidation activities so that the data will not be returned to memory until these activities are completed. This prevents memory incoherency and inconsistency problems from arising.

The inventive system and method provides a mechanism to process requests for the same memory data in an ordered manner. Moreover, the system prevents the memory from re-acquiring the data before any previously-issued requests from one or more of the multiple processors within the same processing node are handled. This prevents the occurrence of temporary deadlock situations that arise when memory thrashing is occurring.

According to one embodiment, a method is provided for use in a system having multiple processors coupled to a memory. The method includes the steps of receiving multiple requests for data from the multiple processors, and if ones of the multiple requests are requesting the same data, creating a respective linked list to record the ones of the multiple requests. The method further includes issuing one of the requests recorded by each linked list to the memory.

According to another aspect, a method of processing requests to a memory is disclosed. The method includes receiving a request for data stored in the memory, and if the request is requesting the same data as another request that is already pending to the memory, linking the request to the other pending request. Steps a.) and b.) are repeated for any additional requests issued to the memory.

According to yet another embodiment, a system for processing requests to a memory is described that includes multiple requesters to issue requests for data to the memory. In one exemplary system, the multiple requests are the processors within a processing node. The system further includes a request tracking circuit coupled to the multiple requesters to retain a record of each request until the request is completed, and to associate a request with any other one or more requests for the same data so that a single request for any given data is pending to memory at a given time.

Also disclosed is a data processing system that includes a memory, and a processing node coupled to the memory to issue requests for data to the memory, wherein the processing node includes a requesting tracking circuit to record, in time-order, requests issued for the same data, and to allow only one of the requests for the same data from being issued to the memory at a given time.

In another embodiment, a system for processing requests to a memory is described that includes processing means for issuing the requests to the memory. The system also includes request tracking means for receiving the requests, for forming an association between any of the requests that are requesting the same data, and for allowing only one of the associated requests to be issued to the memory.

Other scopes, aspects, and embodiments of the current invention will become apparent from the following description and the accompanying drawings.

DETAILED DESCRIPTION OF THE DRAWINGS

Figure 1:
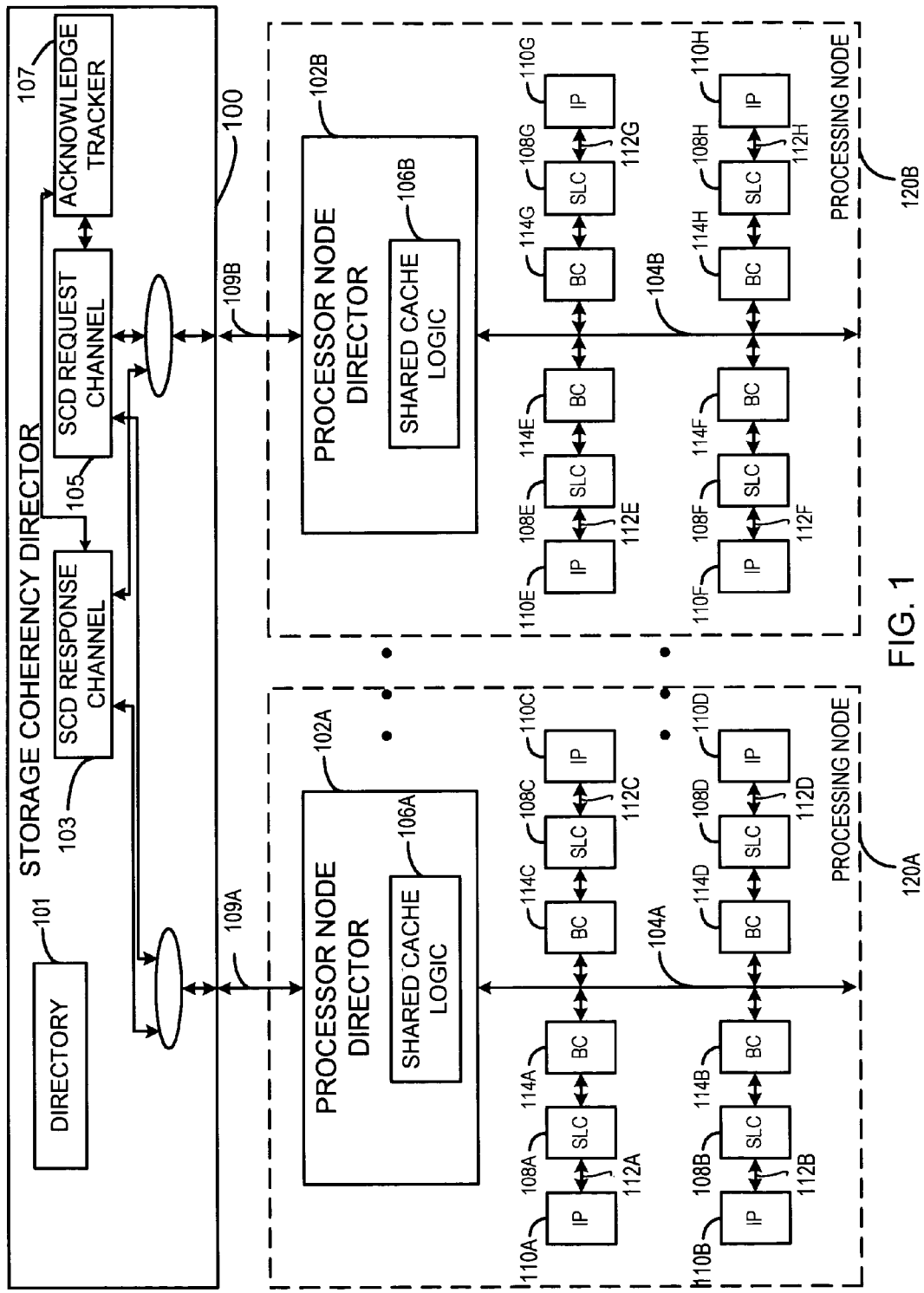
FIG. 1 is a block diagram of an exemplary data processing system of the type that may employ the current invention.

FIG. 1 is a block diagram of an exemplary data processing system that may employ the current invention. The system includes a Storage Coherency Director (SCD) 100 that provides the main memory facility for the system. SCD 100 may include random access memory (RAM), read-only memory (ROM), and any other type of memory known in the art. SCD 100 may be subdivided into multiple subunits (not shown) in a manner largely beyond the scope of the current invention. In one embodiment, SCD is a directory-based storage unit. In this embodiment, SCD retains information in directory 101 that indicates where the latest copy of data resides within the system. This is necessary since data from SCD 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the SCD, where a 128-byte block is referred to as a cache line.

The SCD of the current embodiment includes a SCD response channel 103 and an SCD request channel 105. The SCD request channel 105 is coupled to an acknowledge tracker 107. The use of these channels and the acknowledge tracker is discussed below.

SCD is coupled to one or more Processor Node Directors (PND) shown as PNDs 102A and 102B. The system of the current invention may include more or fewer PNDs than are shown in FIG. 1. Each PND is coupled to SCD 100 over one or more high-speed SCD interfaces shown as interfaces 109A and 109B. Each of these interfaces includes data, address, and function lines.

Each PND includes logic to interface to the high-speed SCD interface, and further includes logic to interface to a respective processor bus such as processor buses 104A and 104B. Each PND may further include shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B, which may utilize any type of bus protocol. Each processor bus further couples to multiple local cache memories through respective Bus Controllers (BCs) 114. Each BC controls the transfer of data between a processor bus and a respective one of the Second-Level Caches (SLCs) 108. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another embodiment, these local SLCs may be Third-Level Caches.

Each SLC 108 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A–114D, SLCs 108A–108D, and IPs 110A–110D may be referred to as processing node 120A. Similarly, PND 102B, processor bus 104B, and all entities associated with processor bus 104B comprise a second processing node 120B. Other processing nodes may exist within the system, and are not shown in FIG. 1 for simplicity.

During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request that is driven onto processor bus 104A by BC 114A. If any of these SLCs has a modified copy of the requested cache line, it will be returned to requesting SLC 108A via processor bus 104A. Additionally, SLCs 108B–108D may have to invalidate any stored copies of the data depending on the type of request made by SLC 108A. This is discussed further below.

PND 102A also snoops the request from SLC 108A. In particular, PND 102A determines whether any other SLC responds to the request by providing modified data on processor bus 104A. If not, data that is retrieved from cache 206 of shared cache logic 106A is provided by PND 102A to SLC 108A.

In some instances, data requested by IP 110A is not resident within any of the cache memories associated with processor bus 104A. In that case, PND 102A must forward the request to SCD 100. SCD 100 determines the location of the current copy of the requested data using information stored within its directory 101. The most current copy may reside within the SCD itself. If so, the SCD provides the data directly to PND 102A. In one embodiment, this is accomplished via SCD response channel 103.

In some cases, request data is stored within another cache memory of a different processing node. In this instance, the way in which the request is handled depends on the type of request that has been made by IP 110A, and the type of access rights that have been acquired by the other cache memory. If IP 110A is requesting "ownership" of the data so that a write operation can be performed, and further if another processing node 120 currently retains ownership of the data, the SCD issues a port Snoop and Invalidate (S&I) request. In one embodiment, this type of request is issued via request channel 105, although in a different embodiment, this request may be issued on response channel 103. This request will cause the processing node to invalidate any stored data copies, and return updated data to SCD 100 so that this updated copy may be forwarded to PND 102A.

In another situation, the IP 110A may be requesting ownership of data that is retained by one or more other processing nodes 120 as read-only data. In this situation, an invalidation request is issued to these one or more processing nodes. The invalidation request causes the nodes to invalidate their copies of the data so these copies may no longer be used. In one embodiment, this type of request is issued on response channel 103, although this need not be the case.

In still another scenario, IP 110A may be requesting read-only access of data that is retained with ownership privileges by another node. In this case, SCD 100 issues a port snoop request. In one embodiment, this request is issued via request channel 105 to cause the other node to return any updated data copy to SCD. This type of request could be issued on the response channel 103 in an alternative embodiment. In a manner that is beyond the scope of the present invention, this processing node may, in some cases, retain a read-only copy of the data. In other cases, all retained copies are invalidated.

Any of the above-described request types may be issued by SCD 100 to a processing node or an SCD interface 109. Within a processing node, these requests are received by the respective PND 102. In one embodiment, this PND may determine, based on stored state bits, whether any of the SLCs 108 within the processing node stores a valid copy of the requested cache line. If so, a request will be issued on the respective processor bus 104 to prompt return of any modified data. Based on the scenario, this request may also result in invalidation of the stored copies, or the conversion of these copies to read-only data. Any updated data will be returned to SCD 100. These aspects of the system are largely beyond the scope of the current invention and are not discussed in detail.

As may be appreciated from the foregoing discussion, some time may expire between the time a processing node makes a request for data and the time the data is delivered to the processing node. By the time the data is delivered, more than one request for that data may have been issued by the IPs within the processing node. Furthermore, while these requests are pending, a request may be received from the SCD to relinquish control over the data in any of the ways discussed above. In prior art systems, a request from SCD 100 could be honored before all previously pending requests from the IPs within the processing node were handled. This could result in data thrashing, since after the data is copied from the processing node to the SCD, the processing node must immediately make another request to get the data back.

The situation described above can be particularly problematic when lock cells are being used to control access to shared data. Recall that a lock cell may implement a software-lock associated with, and protecting, shared data. By software convention, the shared data must not be accessed without first gaining authorization by activating the lock cell. This is accomplished by performing an autonomous test-and-set operation whereby the processor tests the state of the lock cell to determine whether it is available. If it is available, the processor sets the lock cell to an activated state to acquire access to the protected shared data. The processor must deactivate the lock cell before another processor can access the protected data.

Next, consider the situation wherein a first processor within a first processing node is attempting to deactivate a lock cell. At this time, one or more other processors within the same, or different processing nodes are simultaneously performing test-and-set operations in attempt to gain access to the lock cell. The requests from the other processing nodes cause the cache line containing the lock cell to be repeatedly copied from the first processing node to the other processing node(s). If these test-and-set operations happen to be preempting the requests made by the first processor, an unnecessary amount of time may be required to deactivate the lock cell. This may slow throughput significantly for applications that share protected data among processing nodes. In prior art systems, this type of preemption can occur for some period of time, since no mechanism is provided to prioritize requests to the same cache line within a given processing node. The current invention provides a system and method for ordering requests for the same cache line so that a request pending within a processing node will be honored before any subsequently-received request from SCD 100 is processed for the same cache line. This system and method is described in reference to the following drawings.

Figure 2:
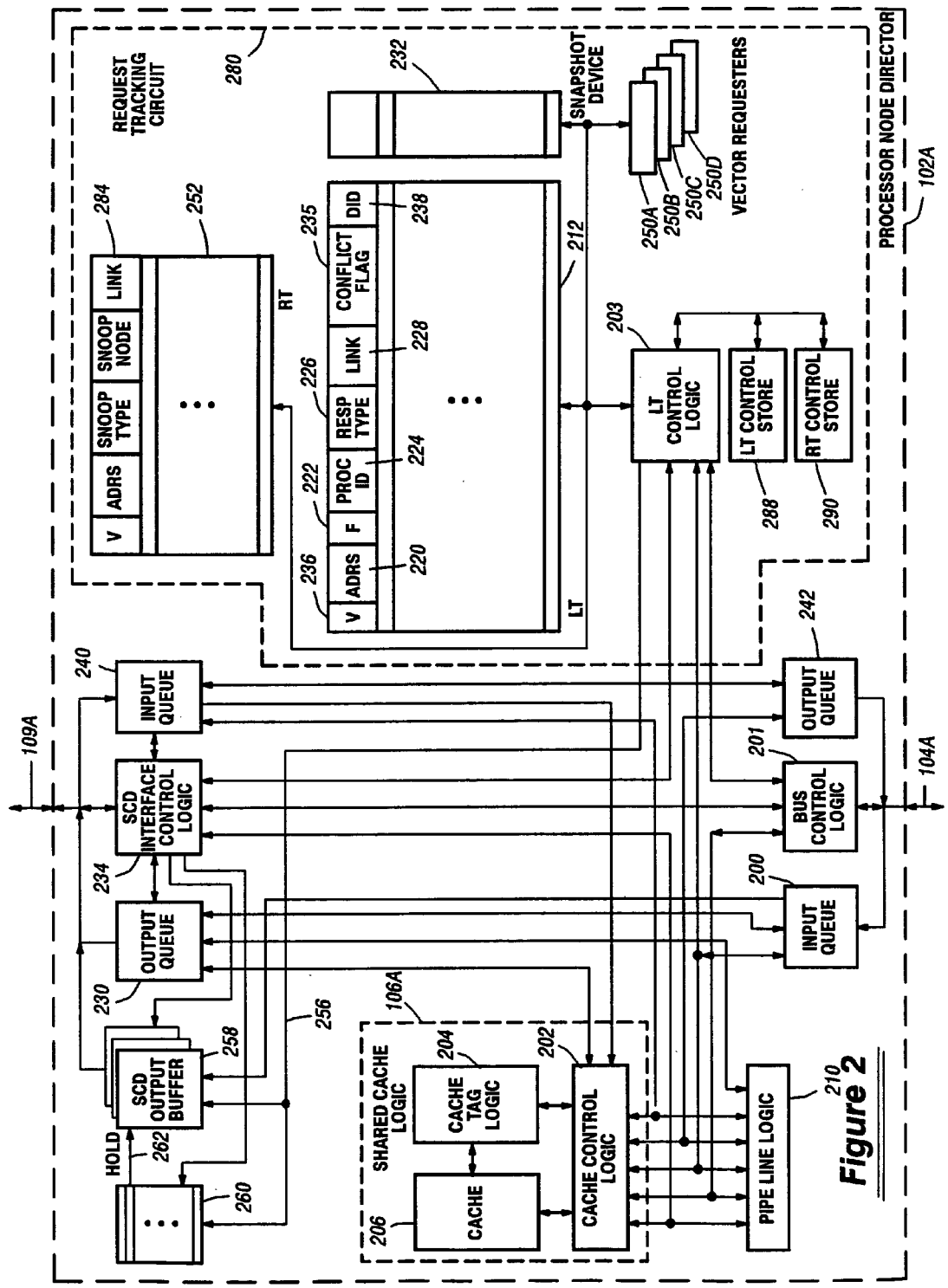
FIG. 2 is a block diagram of one embodiment of the current invention that is adapted for use within a data processing platform similar to that of FIG. 1.

FIG. 2 is a block diagram of logic within a PND 102 according to the current invention. Although PND 102A is shown and described, it will be understood that this discussion applies to any other PND within a data processing system of the type shown in FIG. 1. The logic of FIG. 2 includes a request tracking circuit 280 (shown dashed) that is provided to track outstanding invalidation operations so that data is not written from a PND in a manner that will cause another processor to reference outdated data. This is discussed further below.

The logic of FIG. 2 may best be understood by considering the following example. Assume that IP 110A is requesting ownership of a cache line for update purposes. A cache miss results in SLC 108A, and a request is therefore issued on processor bus 104A to request the data. This request will cause any other SLC on processor bus 104A to return any updated data copy to SLC 108A on the processor bus. If the request is for data ownership, it will also result in invalidation of any other copies retained by the SLCs of processing node 120A.

When the request is provided to processor bus 104A, it is also received by input queue 200 of PND 102A. In response, bus control logic 201 provides a request to pipeline logic 210, which, in turn, initiates a request to cache control logic 202 of shared cache logic 106A (shown dashed). If the requested data resides within cache 206, it will be retrieved so that it can be provided to SLC 108A if none of the other SLCs on processor bus 104A returns an updated copy.

Assume that in the current example, when the request is presented to cache tag logic 204, a cache miss results. This causes bus control logic 201 to issue a deferred response to SLC 108A if none of the other SLCs returns updated data on processor bus 104A. This deferred response indicates the data cannot be returned immediately. A request must then be issued to SCD 100 for return of the data.

Before a request for a cache line can be presented to SCD 100, cache control logic 202 forwards information associated with the cache miss to Local Tracker (LT) control logic 203. LT control logic creates a request entry for the request within a storage device referred to as Local Tracker (LT) 212. LT 212 includes multiple addressable entries shown as entries 0 through N. In one embodiment, LT 212 includes storage space for sixty-four entries, although an LT of a different size may be utilized as well. Each entry may be addressed using an index value. For instance, LT entry 0 is addressed using an index value of "zero", LT entry 1 is addressed using an index value of "one", and so on.

Each LT entry includes multiple fields. An address field 220 stores the request address. In the current embodiment, this address will identify a cache line of memory within SCD 100, wherein a cache line is an addressable contiguous memory portion containing 128 bytes. In another embodiment, any other contiguous portion of memory may be identified by the address. The LT entry further stores a function field 222 that identifies a request type. In this example, the request is a write request. Other types of requests may be tracked, as will be discussed below. Also included in an LT entry is a processor ID field 224 indicating which processor issued the request. In the current example, processor 110A is identified within this field. An additional response type field 226, which is initially left unused, is used to track request responses in a manner to be discussed below.

In addition to the above-described fields, each LT entry includes a link field 228 that is provided to link the current LT entry to any subsequently created entry associated with a request for the same cache line. In one embodiment, the link field may be set to the index value that identifies a latter-created LT entry, as will be described below. Requests are linked in this manner to order the requests for the same cache line according to time-order. If a request entry is already stored within LT 212 for a given cache line such that a linked list is created in this manner, LT will prevent the subsequent request from being issued to SCD 100. Thus, only one request for a given cache line will be pending to SCD at any given time.

Each LT entry further includes a conflict flag 235, which will be used in the manner discussed below to maintain memory coherency. In the current example, this flag is left unused. The LT entry further includes a deferred identifier (DID) field 238 that stores a deferred identifier. This identifier was provided by SLC 108A to PND 102A along with the initial request, and will be used to match the request to a response, as will be discussed below. Finally, each LT entry includes a valid bit in field 236 that is set when a valid entry is created within LT 212. This valid bit is cleared when the entry is later removed from the LT.

While a request entry is being created within LT 212, the request is transferred by pipeline logic 210 to output queue 230. A transaction identifier is included with the request. This transaction identifier is set to the index value for the LT entry that is tracking this request. This transaction identifier will be used to match a response from SCD 100 with the request information stored within LT 212, as will be described below. When the request gains priority, the request and transaction identifier are transferred via interface 109A to SCD 100 for processing.

Assume that after the above-described request is issued to SCD for processing, IP 110B makes a read request for the same cache line. In the manner described above, this request results in a miss on processor bus 104A, and also results in a cache miss to cache 206.

In prior art systems, it is determined that IP 110B and SLC 108B are requesting access to a cache line that is currently being requested from SCD 100. Therefore, a conflict is detected and a retry response is issued to SLC 108B. This will cause SLC 108B to re-issue the request for this cache line at a later time. However, since the timing of the retry response is not entirely predictable, the cache line could be returned to the processing node for processing by IP 110A. It could then be requested by SCD and transferred from the processing node before SLC 108B has a chance to re-issue the request. This can result in memory thrashing, as discussed above.

The current invention addresses this situation by creating an entry in LT 212 for the request issued by SLC 108B. Specifically, when the request results in a miss to cache 206, the request information is provided to LT control logic 203. LT control logic 203 searches LT 212 to determine whether an entry exists for the current cache line. The request entry for IP 110A is located. LT control logic 203 then makes a second entry for the cache line. This entry identifies IP 100B in processor ID field 224, and further identifies the request as a read request without ownership in function field 222. The valid bit in field 236 is activated, and the address field 220 is set to include the address of the cache line. Response field 228 and conflict flag 235 remain unused. The link field of the request entry for IP 110A is set to point to this newly created entry. In one embodiment, if the newly created entry is created within storage location "two" of LT 212, for example, the link field of the first entry is set to "two", and so on.

Because a request entry exists within LT 212 for the current cache line, the request issued by IP 110B will not result in the issuance of a request to SCD 100. In addition, PND 102A issues a deferred response to IP 110B on processor bus 104A indicating that the request cannot be satisfied at this time.

After SCD receives the request for the cache line, directory 101 is referenced to determine whether any of the one or more other processing nodes within the system stores a copy of the requested data. In the current example, it will be assumed the most recent copy of the requested data is available within SCD 100. This data is provided to PND 102A along with the original transaction identifier and a response type of ownership-with-data. This response type indicates that there is no outstanding response associated with the data. Other cases involving the return of data while some responses are still outstanding are discussed below.

When the PND receives the data and response from SCD 100, the transaction identifier provided with the response is used by LT control logic 203 to reference LT 212 and retrieve the deferred identifier for this request from DID field 238. The returned data is routed from Input queue 240 to output queue 242, and is provided on processor bus 104A. In one embodiment, this data is provided to SLC 108A during what is known as a "deferred phase". A deferred phase is one of the ways a PND 102 provides data following the issuance of a deferred response. During a deferred phase, PND 102 places an encoded value on processor bus 104A indicating that a deferred phase is occurring, along with the deferred Identifier retrieved from LT 212. The deferred identifier is used by the target SLC to match the returned data with the original cache line request. In the current example, after SLC 108A receives and processes the deferred phase, the data will be forwarded to IP 110A to satisfy the initial request.

In addition to providing the data to processor bus 104A, PND 102A also routes the data and address to pipeline logic 210, which initiates a request to cache tag logic 204. A replacement operation is initiated to update the cache tag logic 204 and store the data to cache 206. Finally, the address and transaction identifier are provided to LT control logic 203. LT control logic 203 uses the transaction identifier that was returned with the data to remove the first request entry associated with IP 110A from LT 212 by clearing valid bit 236.

When LT control logic 202 removes an entry from LT 212, it is determined whether the entry being removed is linked to any other entry in the LT. If it is, LT control logic 203 begins the process of unlinking all of the requests within that linked list of entries as follows. LT control logic 203 first determines what type of action must be taken to satisfy the request that is associated with the next entry in the linked list. The type of action taken depends on the type of access rights that have been granted by SCD 100 to processing node 120A for the requested data, on the type of access rights that have been granted to one or more of the units within the processing node for the requested data, and on the type of access rights requested by the next entry in the linked list. In one embodiment, LT control logic 203 includes a lookup table that is referenced with this information to determine the course of action LT control logic 203 should take.

According to one aspect of the invention, the lookup table used to control the unlinking of LT entries may be programmable, and may be stored within a memory such as LT control store 288. This lookup table could be modified using a scan-set interface, as is known in the art. By allowing the information to be programmable, the type of actions taken to unlink the entries within LT can change as the needs of the system change. For example, if different types of processors are coupled to processor bus 104A, the types of requests that may be issued to obtain data in various situations may change. This can be accomplished merely by modifying the control store. As a general rule, normal processing activities must be halted before modifying LT control store 288 so as to avoid the occurrence of errors.

In the current example, IP 110A has been granted ownership to the data, and IP 110B is requesting read-only access. Using a lookup table or any other appropriate means, LT control logic 203 determines which actions to take. In this instance, LT control logic 203 prompts bus control logic 201 to issue a request on processor bus 104A to snoop the cache line for a shared copy. This request, also referred to as a "snoop", directs SLC 108A to return any modified copy of the cache line on processor bus 104A. A copy of this data may be retained by IP 110A and SLC 108A for read-only purposes.

When SLC 108A responds to the request by placing the cache line data on processor bus 108A, the data is read into input queue 200 of PND 102. Bus control logic 201 then issues a deferred reply on processor bus 104A. In one embodiment of the invention, the deferred reply is issued using the same bus protocol as the previously issued snoop, which keeps the snoop and the deferred reply in order on processor bus 104A. Like the deferred phase, a deferred reply is a mechanism for providing data to one of the SLCs 108 in response to a deferred request. The deferred reply includes the deferred identifier from field 238 of the current LT request entry for SLC 108B. Recall that this identifier allows the targeted SLC to match the data that accompanies the reply to a previous request. This deferred reply also indicates the type of access rights being granted with the data. In the current instance, the data is provided to SLC 108B with read-only access rights.

In the foregoing example, a request was issued on processor bus 104A to obtain the cache line from SLC 108A followed by a deferred reply to provide that data to SLC 108B. This request and deferred reply are autonomous, meaning that no other requests or other types of operations are allowed to gain access to processor bus 104A after the request and before the deferred reply. This guarantees that SLC 108B will be the next entity to gain access to the cache line, and will prevent any other request from intervening to obtain this cache line. For example, this prevents a request from a different SLC on processor bus 104A from being received by PND 102A and thereafter preempting the servicing of the request from SLC 108B. In one embodiment, this autonomy is achieved when bus control logic 201 asserts a bus priority signal on processor bus 104A during both the request and the deferred reply. This signal prevents any other unit on processor bus from gaining control over the processor bus to make a request.

As a result of the snoop to processor bus, PND 102A initiates a replacement operation. Any updated data returned by SLC 108A is forwarded to pipeline logic 210, which initiates a request to cache tag logic 204. The tag information is updated based on the response to the request, and the updated data is stored to cache 206. When this replacement operation has been completed, LT control logic 203 removes the request entry for SLC 108B from LT 212 by clearing valid bit in field 236. If this entry is linked to still another entry, the process described above may be repeated. That is, an unlinking process is initiated for any next entry in the list. This unlinking process will solicit the return of the cache line from whichever entity most recently received this data. In the current example, this is SLC 108B. This request for return of the data will be followed by a deferred reply that provides the data to the entity identified in this next LT entry.

As discussed above, a request and subsequent deferred reply are issued in a manner that is dictated by the access rights granted to the entity that retains the data at the time of the request, and is further based on the access rights requested by the next LT entry. The foregoing example describes the situation wherein SLC 108A was granted ownership and SLC 108B was requesting read access. In another scenario, SLC 108B may be requesting ownership. In this instance, PND 102A will issue a request on processor bus 108A to cause SLC 108A to return the data copy and invalidate all copies of the data retained by SLC 108A and IP 110A.

In yet another scenario, SLC 108A retains a read-only copy of the data and SLC 108B requests ownership. In this instance, a request is issued on processor bus to cause SLC 108A to invalidate the read-only copy. Pipeline logic 210 causes cache control logic 202 to perform a cache read to obtain the cache line with ownership privileges from cache 206. If processing node 120A does not own the cache line, the request from SLC 108B cannot be satisfied. Therefore, instead of returning the data to SLC 108B, bus control logic 201 issues a retry response. At this time, the LT entry is removed from LT 212.

In response to the retry indication, SLC 108B will either then, or at some later time, re-issue the original request for the cache line to processor bus 104A. When this request is re-issued, a miss occurs to processor bus 104A and to cache 206. Therefore, a request entry is created within LT 212 in the manner discussed above and a request for ownership of the data is issued to SCD 100. Data returned from SCD 100 will be handled in the manner previously described.

The foregoing example considers the general process used to handle request entries that are linked within LT. Some special case scenarios may arise that cause the above process to be altered. Returning to the current example, assume SCD 100 returns data and ownership for the cache line requested by SLC 108A. The data is forwarded by PND 102A to SLC 108A for processing. After this occurs, and before the replacement operation can be completed to store this cache line to cache 206, IP 110A updates the data. SLC 108A then returns the updated data back to the PND. This could occur because the SLC is explicitly writing the data from its cache during a write back operation, or because another processor on processor bus 104A requested the data, and SLC 108A is responding with an updated copy that is provided via processor bus 104. In both cases, LT control logic 203 will determine that the original replacement operation to cache 206 should be aborted and the data discarded, since this replacement operation is now associated with an outdated copy of the cache line. Instead, the updated data from IP 110A will be stored to cache 206.

Although the replacement operation is not performed in the current instance, the LT control logic 203 will process the original request entry associated with SLC 108A in the manner discussed above. That is, after the original request entry is removed from LT 212, any LT entries linked to this entry are likewise unlinked and removed. As each entry is unlinked, a request for data is issued to processor bus 104A, followed by a deferred reply that is autonomously associated with the request for data. During this process, a request for data made to processor bus 104A may result in a miss if that data was returned to PND 102A during a write back operation. If this occurs, the subsequent deferred response will provide a copy of the data retrieved from cache 206 to whichever SLC 108 is associated with the next request in the linked list.

In yet another scenario similar to the one discussed in the foregoing paragraphs, the cache may be full when the write back operation is presented by SLC 108A to pipeline logic 210. In this case, the updated data from SLC 108A cannot be stored to the cache, and instead must be transferred to SCD 100. If the original request entry did not receive a split response, this data may be provided directly to SCD 100 without delay. If the original request entry did receive a split response, however, the data must be transferred from input queue 200 to one of SCD output buffers 258. LT control logic 203 creates an entry in the one of output buffer registers that corresponds with the SCD output buffer storing the data. This entry contains control bits that activate hold line 262, thereby preventing the transfer of the updated data to SCD. These hold lines will remain activated until the invalidate-complete response is received from SCD for the original request. When this response is received, LT control logic 203 clears the control bits to deactivate hold line 262, thereby allowing the transfer of data to occur.

In either of the cases described above involving the port memory write, LT control logic 203 creates an entry in LT 212 to track the port memory write operation. Format field 222 is set to indicate that the entry is associated with a port memory write. This entry is linked to the last entry in the linked list for this cache line in the manner discussed above.

A linked list of entries containing a port memory write is processed as follows. LT 212 will eventually remove the original request entry from LT 212. Recall that if this request entry is associated with a split response, the removal of this entry will not occur until the associated invalidate-complete response is received. At this time, the replacement operation for the associated data is aborted if the abort flag is set, as is the case in the current example. Thereafter, any linked request entries are unlinked as discussed above. When an entry for the port memory write operation is encountered, the unlinking processed is halted. This entry remains stored within LT until a response is returned from SCD 100 indicating the port memory write operation completed successfully. At this time, any LT entries linked to the port memory write entry will be unlinked in the manner discussed above.

While a port memory write entry is stored within LT 212, any subsequently received requests for the same cache line are handled in a special manner as follows. If a read request is issued to processor bus 104A during this time, LT control logic 203 causes a deferred reply to be issued to processor bus 104A. LT control logic 203 further creates an entry within LT 212 for this read request. This new entry is linked to the port memory write entry.

In another scenario, updated data may be placed on processor bus 104A by one of the SLCs within the processing node while a port memory write entry is stored within LT 212. This may occur either because an SLC is performing a write back operation to cache 206, or because the SLC is responding to a request for the data that was issued by another SLC on the processor bus. In either case, this data cannot be stored to cache 206 because the cache is full as discussed above, and a port memory write operation must be scheduled. The data is transferred into an available one of SCD output buffers 258, and LT control logic 203 initializes one of the output buffer registers 260 to activate hold line 262 for this data. A second port memory write entry is created in LT 212, and is linked to the linked list of entries for this cache line. This second port memory write operation will not be allowed to complete until an acknowledgement is received from SCD 100 that the first port memory operation was successfully processed.

When the acknowledgement is received from SCD for the first port memory write operation, the port memory write entry is removed from LT 212. Any entry linked to this entry is unlinked and processed by issuing a request following by a deferred reply to whichever SLC and IP are indicated by processor ID field 224 of the entry. It is possible that during this unlinking process, a request for the data will result in a miss both to processor bus 104A and to cache 206. In this case, a retry response is issued as the deferred reply. In response to this retry response, the SLC receiving this response will re-issue the original request. This will result in the creation of another request entry within LT 212, and may also result in a request being issued to SCD 100 for the data, assuming no other request for data has been issued to SCD for this cache line. Subsequent requests for this data will result in LT request entries that are linked to this entry in the manner discussed above.

The foregoing example describes the manner in which requests for the same cache line are linked within LT. This discussion focuses on requests from processors within the same processing node. However, other types of requests can also be linked to the linked list of request entries. This can best be understood by returning to the previous example wherein two requests from SLC 108A and SLC 108B, respectively, have resulted in the creation of two linked LT request entries. Moreover, the request from SLC 108A has been forwarded to SCD 100 for return of the data. SCD 100 processes this request and forwards the data with ownership on response channel 103. Sometime thereafter, SCD processes another request for this cache line that was received from a different processing node. SCD's directory 101 indicates that the data was provided to processing node 120A. Therefore, SCD issues an S&I request to PND 102A for this cache line on request channel 105.

Because this S&I request is issued on request channel 105 and the response was issued on response channel 103, the S&I request may by-pass the response. Assume for this example that the request does, in fact, by-pass the earlier issued response that includes the data. When this request is received by PND 102A, LT control logic 203 searches LT 212 for an entry associated with the requested cache line. If a request entry exists, indicating a request from SCD 100 by-passed an associated response in the above-described manner, an entry is created to record this SCD request. Because this entry is associated with a request from SCD 100 instead of one of the SLCs, this entry is created within a Remote Tracker (RT) 252 rather than LT 212.

RT 252 is a storage device used to track all SCD requests that must be delayed because they are requesting the same cache line that is already associated with an entry within LT. In one embodiment, RT 252 is capable of storing sixty-four entries, although any other storage capacity may be utilized in the alternative.

A RT entry includes information provided with the SCD snoop request such as the cache line address, the snoop request type, and the identity of the processing node that initiated the snoop request. In a manner similar to that described above with respect to a LT entry, a valid RT entry is designated by setting a valid bit stored within the entry. The newly created RT entry is linked to the LT conflict entry for this cache line by storing the number of the RT entry within link field 228 of the LT entry along with an indication that the linked entry is stored in RT 252 instead of LT 212. In the current example, this entry is linked to the request entry that was created because of the request from SLC 108B.

When the cache line data is finally received from PND 102A on the response channel, the linked list of entries within LT 212 is processed in the manner discussed above. When the second entry is removed from LT 212 after the cache line has been provided to SLC 108B, LT control logic 203 begins the process of unlinking the entry in RT 252 for this cache line. During this process, LT control logic 203 causes a request to be issued on processor bus 104A for the data. The type of request that is issued will depend on the access rights currently granted for this data, and on the type of request issued by SCD 100. In the manner discussed above, this request type may be determined using a lookup table. This lookup table may be programmable, and may be stored within a control store memory such as RT control store 290 of FIG. 2. In another embodiment, this lookup table may instead be retained within LT control store 288. By making the unlinking process programmable, system operations may be revised as needed. For example, the unlinking processing may be changed to accommodate system updates. Both LT and RT control stores may be programmed using a scan-set interface, as is known in the art.

Returning to the current example, recall that SLC 108B retains a read-only copy of the data. Assume, further, that SCD 100 is requesting return of ownership. Therefore, LT control logic 203 causes bus control logic 201 to issue a request for SLC 108B to invalidate its copy. Any updated copy of the data will be obtained from cache 206 for return to SCD 100. The copy within cache 206 will be invalidated, and the entry will be removed from RT 252 by clearing the valid bit.

In another embodiment, one of SLCs 108A–108D may own the cache line when the request from RT 252 is unlinked. In this scenario, LT control logic 203 causes bus request logic 201 to issue a request for return of any modified data copy from the SLC to PND 102A and to invalidate its data copies. PND forwards the modified data to SCD 100, and further invalidates its copy within cache 206. Finally, the RT entry is removed from RT 252.

In still another instance, SCD 100 is requesting return of ownership only, while allowing the processing node to retain a read-only copy of the data. Assuming one of the SLCs 108A–108D owns a copy of the cache line, LT control logic 203 causes bus request logic 201 to issue a request for return of ownership and any updated copy of the cache line. The SLC is allowed to retain a read-only copy of the data. PND 102A returns any updated copy of the cache line with ownership to SCD 100.

In yet another scenario, the SLC that most recently retained the data may have stored the updated data back to cache at a time when a replacement operation could not be performed. In this scenario, a port memory write operation occurs in the manner discussed above, and an LT entry is created to track the port memory write operation. When the RT entry is unlinked, the request to processor bus for the data 104A will result in a miss, as will a request to cache 206. LT control logic 203 will locate the port memory write entry within LT 212 and re-link the RT entry to this entry. When the response for the port memory write operation is received from SCD 100 indicating the write operation is complete, the RT entry may be unlinked. This causes a request to again be issued to processor bus 104A for the data. Another miss will occur, and a response will be issued to SCD 100 indicating the processing node does not retain the data.

The foregoing discussion describes the use of RT 252. As discussed above, a RT entry may be linked to a LT entry through the use of link field 228 within the LT entry. In a similar manner, each RT entry includes a link field 284. An RT entry may be linked to an LT entry in a manner similar that described above. That is, the RT link field 284 is set to point to an entry within LT that is associated with the same cache line. This may occur as follows. Assume that after the RT entry of the current example has been created, and before the requested cache line is returned to PND 102A, yet another request for the same cache line is received from SLC 108C. This new request will be stored within LT 212 in the manner discussed above. Field 284 of the current RT entry will be set to point to this new LT request entry. This new LT request entry may further point to still another LT entry if another request for the same cache line is received.

Processing of a LT request that is linked to a RT request occurs as follows. When the RT entry is unlinked from the linked list in the manner discussed above, the cache line data is returned to SCD 100. LT control logic 203 then begins the process of unlinking the next LT entry. LT control logic 203 signals bus control logic 201 to issue a request on processor bus 104A for the data. The current LT entry is then removed from LT 212. The request will result in a miss to processor bus 104A and a miss to cache 206. Because of this, a retry response will be issued to SLC 108C. This retry response will cause SLC 108C to re-issue the request for the cache line on processor bus 104A. This request will again result in a miss on both processor bus 104A and to cache 206. LT control logic 203 will create a request entry within LT, and a request for the cache line will be issued to SCD 100.

The unlinking process discussed above could continue for additional LT entries. For example, when the LT entry for SLC 108C is removed from LT 212, a next LT entry in the list could be unlinked in a manner similar to that discussed above. A retry response will be issued on processor bus 104A, and the LT entry will be removed from LT 212. This retry response will cause the target SLC to issue another request for the cache line, which will result in a miss on processor bus 104A and a miss to cache miss. A LT entry will be created within LT 212 that is linked to the request entry created for SLC 108C.

It may be noted from the foregoing that a linked list of request entries may include multiple LT entries. However, this linked list will include, at most, one RT entry. This is because SCD 100 will not issue a request for return of a cache line while another request issued by SCD for the same cache line is still outstanding.

The foregoing examples discuss processing of a linked list of LT and RT entries for those situations wherein data is returned from SCD 100 to PND along with an indication that all coherency actions have been completed for that data. In other cases, however, data is returned before all coherency actions have been completed during what is known as a "split response". In this situation, data is provided by SCD 100 to the PND before all read-only copies of the data that are stored elsewhere within other processing nodes of the system have been invalidated. Data is provided in this accelerated manner to allow the requesting processing node to begin using that data without the delay associated with completing the invalidation operations. Eventually, when the invalidation operations associated with a split response are complete, an invalidate-complete response is issued by SCD 100 to PND 102A.

Split responses are tracked by the PND in a special manner using LT 212 as follows. Assume that PND 102A issues a request for data and ownership to SCD 100. Directory 101 indicates that one or more other processing nodes within the system retain a read-only copy of this data. These copies must be invalidated so that processing node 120A can update the requested data. Therefore, SCD issues one or more invalidation requests to these other processing nodes to invalidate the read-only copies.

Before SCD receives an acknowledgement from these other processing nodes indicating that the one or more invalidation operations have completed, SCD provides the requested data to PND 102A via SCD response channel 103 and interface 109A. The data is provided along with the original transaction identifier, and a response type of "data-with-invalidate-pending", which indicates that the data is being provided before the invalidation operations have been completed.

When PND 102A receives the data, it is processed in the manner discussed above. That is, a transaction identifier provided with this response is used to address LT 212 to obtain the deferred identifier for the request. This identifier is used to issue a deferred phase along with the data to the SLC 108 that issued the initial request. This data can be forwarded to the requesting IP to allow that processor to continue processing activities. In addition, a replacement operation is scheduled to store the returned data to cache 206 and update cache tag logic 204.

Because the response is a data-with-invalidate-pending response, the LT request entry will not be removed from LT. Instead, LT control logic 203 updates the entry, setting response type field 226 to a response type of invalidate-pending. This records that invalidation operations are outstanding for this request.

Assume that before the data was returned from SCD 100, one or more other requests were made for the same data. These requests will result in the creation of additional LT request entries in the manner discussed above. The additional entries will be linked to the first request entry. LT control logic 203 will not begin to unlink this linked list of requests until the invalidation operations that are outstanding for the original request are received in the manner discussed above.

Recall that SCD 100 issued one or more invalidation requests to one or more other processing nodes to request invalidation of the read-only copies of the current cache line data. When a PND of a processing node receives an invalidation request from SCD, all read-only copies of the data stored within an IP, SLC, or the shared cache of that processing node will be invalidated. The PND will then respond to SCD 100 with an invalidation acknowledge, which, in one embodiment, is issued on SCD response channel 103.

Response channel 103 is coupled to acknowledge tracker 107, which is tracking all outstanding invalidation activities for the cache line. When an invalidation acknowledge is received from each processing node that was issued an invalidation request, acknowledge tracker 107 signals SCD request channel 105 to issue an acknowledgement that is referred to as an invalidate-complete response. This response is sent via response channel 103 and interface 109A to input queue 240 of PND 102A.

An invalidate-complete response includes a transaction identifier. LT control logic 203 utilizes this transaction identifier to address LT 212 and obtain the associated request entry, which will have a response type in field 226 of invalidate-pending. Because the outstanding invalidate-complete response has been received for the cache line, the request entry may now be removed from LT 212. This is accomplished by clearing the valid bit for this entry. At this time, any linked entries may be unlinked in the manner discussed above.

The foregoing discusses the linking of request entries with LT 212. A second type of entry, known as a "conflict entry", may also be linked to the linked list of entries. A conflict entry is created after data has been provided to a processing node with a split response in the manner discussed above. When this data is returned in this manner, whichever IP requested the data, as identified in processor ID field 224 for this request entry, becomes known as an "invalidate-pending." processor. This IP will be considered an invalidate-pending processor as long as there is at least one request entry within LT 212 for that IP having a response type in field 226 of invalidate-pending. The invalidate-pending LT entries for IPs 110A–110D are tracked by vector registers 250A–250D, respectively. In one embodiment, these registers store a master-bitted value for this purpose.

Occasionally, data that has been updated by an invalidate-pending IP is stored by that IP's SLC to cache 206. This may occur, for example, because an invalidate-pending processor explicitly writes the data back to PND 102A during a write back operation, or because the invalidate-pending processor's SLC responded to a request from another SLC 108 on processor bus 104A. In this latter case, when the data is driven onto processor bus 104A by the responding SLC 108, PND 102A snoops a copy of the updated data, which will be stored to cache 206 if a replacement operation is possible. In either instance, because an invalidate-pending processor returned the updated data, which is written to cache 206, a conflict entry is stored within LT 212. This conflict entry is created to prevent this updated data from being transferred out of cache 206 to SCD 100 before all invalidation operations that may affect the coherency of this updated data have been competed. A complete discussion concerning the requirement to handle data in this manner is provided in co-pending application Ser. No. 10/600,205 entitled "Data Acceleration Mechanism for a Multiprocessor Shared Memory System", referenced above.

A conflict entry is created in LT 212 by LT control logic 203. This type of entry is differentiated from request entries by setting a conflict flag in field 235. This entry further includes address field 220, which stores the address of the updated cache line. Processor ID field 226 stores an identifier indicating which invalidate-pending processor provided the data written to cache 206. Link field 228 is used in the manner discussed above to link this entry to any future LT entry that is associated with the current cache line. This may include additional request and/or conflict entries as discussed above. Finally, valid bit in field 236 is activated to indicate the LT entry is valid.

When LT control logic 203 creates a conflict entry within LT, an associated entry is created within snapshot device 232. The details regarding this snapshot entry are described in the application entitled "Data Acceleration Mechanism for a Multiprocessor Shared Memory System" referenced above. It is sufficient to note that this snapshot entry records all potential conflicts that may exist for the cache line associated with this entry. This cache line will not be allowed to exit the processing node until all of the potential conflicts recorded by the conflict and associated snapshot entries have been cleared.

A conflict entry of the type described above may also be created to record the occurrence of a request that is received from SCD 100. For example, assume SCD issues an S&I request for a cache line to PND 102A. PND will issue a request on processor bus 104A for return of the data, and will further read cache 206. Assume that the requested data is either obtained from an invalidate-pending processor, or resides within cache 206 and is associated with a conflict entry within LT 212. In either of these cases, LT control logic 203 creates a conflict entry within LT 212 for the cache line. This LT entry will be linked to the linked list of request and/or conflict entries associated with the same cache line. Additionally, an associated entry is created within snapshot device 232 to store any potential conflicts that may exist for the current cache line. In addition to creating a conflict entry in LT 212, an entry is created in RT 252. The newly created RT entry is linked to the LT conflict entry for this cache line by storing the number of the RT entry within link field 228 of the LT entry along with an indication that the linked entry is stored in RT 252 instead of LT 212.

Whenever another conflict entry is created in LT for this cache line, it will be linked to the existing linked list of entries for this cache line. If the RT entry is the last entry in the linked list, field 284 of the RT entry is updated to point to the new LT entry. Because SCD will allow, at most, one request for the same cache line to be outstanding to a processing node at any given time, the linked list of entries for a given cache line will include, at most, one RT entry.

Processing of a linked list containing conflict entries occurs as follows. The first request entry in the linked list is processed only after all invalidation operations associated with the data have been completed. This means that in the case of split responses, a request entry is not removed from LT until the associated invalidate-complete response is received from SCD 100. Thereafter, the unlinking of request entries proceeds in the manner discussed above. This is generally accomplished using request and deferred reply operations that are autonomously linked as previously described. When a conflict entry is encountered during this unlinking process, the unlinking stalls. A conflict entry is not removed from LT 212 until all invalidate-pending request entries being tracked by this conflict entry and the associated snapshot are cleared. This occurs when corresponding ones of the invalidate-complete responses are received from SCD 100.

When all required invalidate-complete responses are received in a manner described in the co-pending application entitled "Data Acceleration Mechanism for a Multiprocessor Shared Memory System", a conflict entry is removed from LT. If the removed conflict entry points to a RT entry, the unlinking of this RT entry occurs as follows. The RT entry is removed from RT 252, and LT control logic 203 signals bus control logic 201 to re-issue the request for the cache line on processor bus 104A. Pipeline logic 210 will also initiate a request to cache control logic 202. These requests will result in a processor bus miss, and a hit to cache 206. LT control logic 203 will determine that all conflicts have been cleared for the current cache line, and the data from cache 206 will be forwarded to output queue 230 for transfer to SCD 100.

If the RT entry is linked to additional conflict entries, processing of those entries will occur as follows. When the RT entry is removed from RT 252, LT control logic 203 unlinks the next LT conflict entry on the linked list by re-issuing a request for the cache line to processor bus 104A, and by initiating a read to cache 206. Because the cache line was returned to SCD 100 during the previous transaction, both operations will result in a miss. As a result, PND 102A will issue a retry indication to processor bus 104A, causing this IP to re-issue the request for this cache line. When this request is re-issued, a request entry will be created within LT in the manner discussed above, and a request will be made to SCD for the cache line. This process effectively converts the conflict entry into a request entry. Any subsequent conflict entries in the linked list can be converted to request entries in a similar manner. These additional request entries will be linked to the request entry that results in the request to SCD 100.

The above-described invention provides a system and method for ordering the processing of requests for the same cache line that originate within the same processing node before a request that is received from SCD 100. This prevents data thrashing that can occur because data is transferred from a processing node as a result of a request from SCD that is received after an earlier request by an IP for the same processing node. In an environment wherein shared data is protected by a lock cell, the current invention can significantly reduce the time required to deactivate the lock cell, allowing additional processing to occur on the protected data. The current invention further provides a mechanism for linking, and later processing, multiple types of entries, including various request entries, port memory write entries, conflict entries, and entries from SCD requests in a manner that ensures memory coherency is maintained.

Figures 3, 3A:
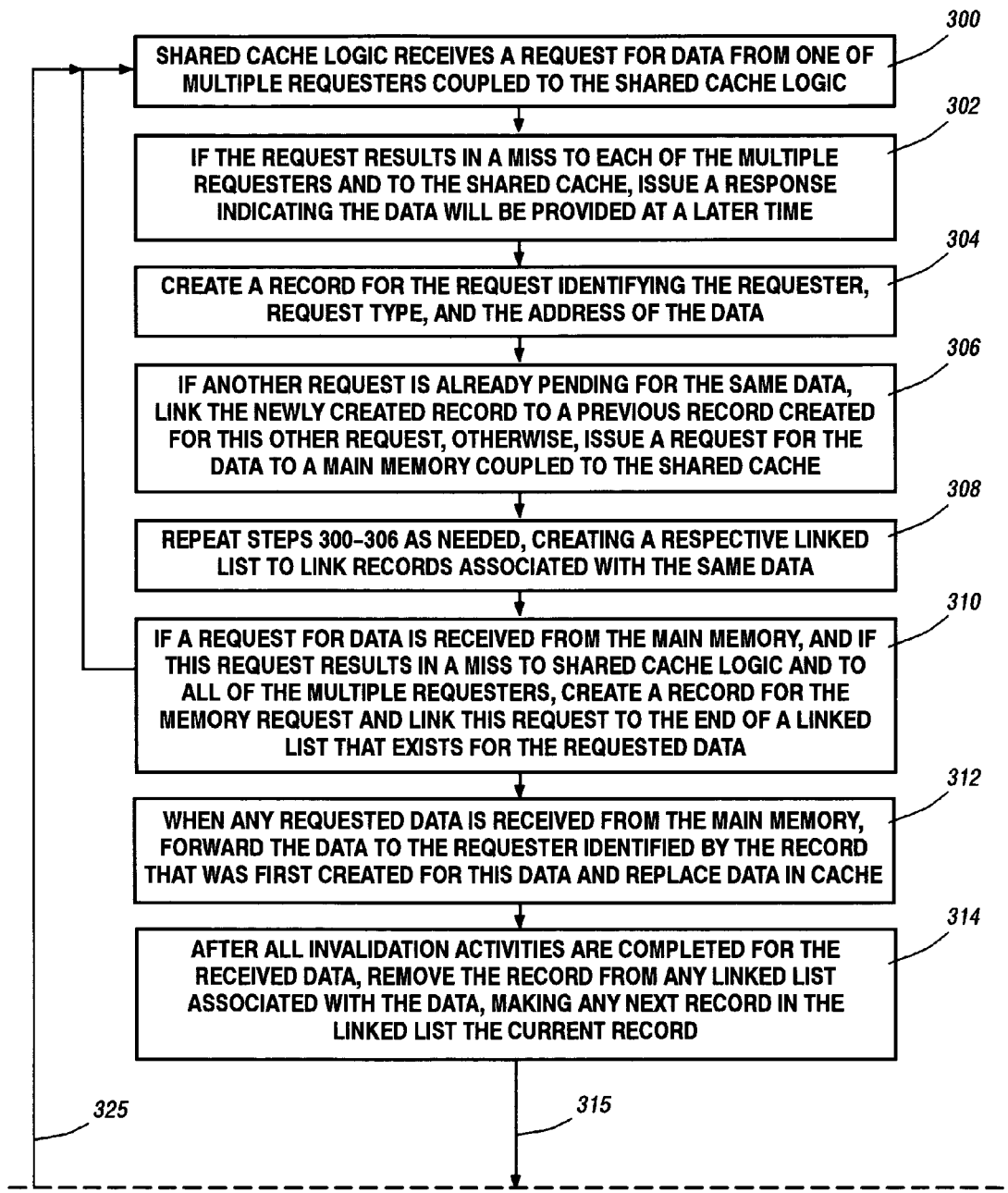
FIGS. 3A and 3B, when arranged as shown in FIG. 3, are a flow diagram illustrating one method of the invention according to the current invention.
Figure 3B:
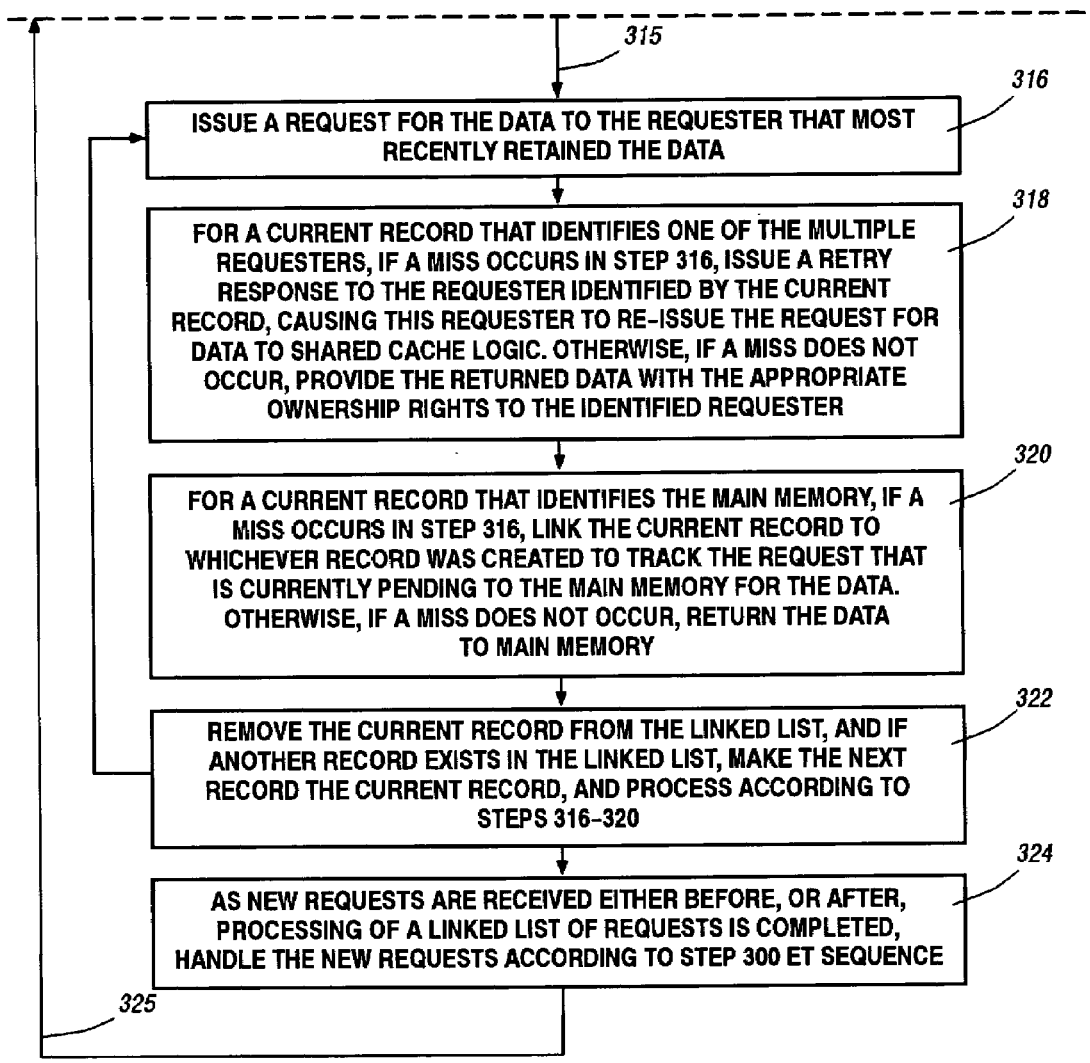
Figure 3:

FIGS. 3A and 3B, when arranged as shown in FIG. 3, are a flow diagram illustrating one method of the invention according to the current invention. According to step 300, shared cache logic receives a request for data from one of multiple requesters that are coupled to shared cache logic. In one embodiment, the multiple requesters include multiple processors within the same processing node. If the request results in a miss to the shared cache logic, and further assuming none of the other multiple requesters retains a modified copy of the requested data, the shared cache logic issues a response to the requester indicating the data will be provided at a later time (302).

Next, a record is created for the request (304). This record includes information identifying the requester, the type of the request, and the address of the requested data. If another request is already pending for the same data, the newly created record is linked to the record created for the previous request. Otherwise, if another request is not pending for this data, a request for the data is issued to a main memory that is coupled to the shared cache logic (306). Steps 300–306 may be repeated as needed, with any records for the same data being linked together into a linked list (308). While this process is occurring, a request for data may be received from the main memory. If this request results in a miss to shared cache logic, and if none of the multiple requesters retains a copy of the requested data, a record is created for this memory request (310). This record will be linked to any records already existing for the same data.

When data is received by shared cache logic from the main memory, this data is forwarded to whichever requester first requested the data, as identified by the oldest record that is associated with this data (312). Additionally, a replacement operation is scheduled to store the data to the cache and update the cache tag logic.

After any pending invalidation operations have been completed for this data, as will be indicated by an acknowledge provided as the second portion of a split response, the oldest record for this data may be deleted (314). Main memory signals the completion of the invalidation operations at a later time via an invalidate-complete response provided to shared cache logic.

Continuing to FIG. 3B, as indicated by arrow 315, if any other record(s) exist for this data, the next record in the linked list becomes the current record. Next, a request is issued to the requester that most recently retained the data. This request solicits the return of that data to shared cache logic (316). If the current record identifies one of the multiple requesters, and if the issued request results in a miss both to the target requester and to shared cache logic, a retry response is issued to the requester identified in the current record, causing this requester to re-issue the request to shared cache at a later time. This will eventually result in the issuance of another request to memory, as was discussed above in reference to FIG. 2. This request will be handled as described in steps 300 et sequence. Otherwise, if a cache miss does not result, the returned data is provided to the identified requester (318).

If the current record does not identify one of the multiple requesters but instead identifies the main memory, and if a miss occurs, as may be the result of a previously issued port memory write operation as was described above in regards to FIG. 2, the current record is linked to the request entry previously created for this operation. Otherwise, if a miss does not occur, the data returned as a result of the request is forwarded to main memory (320).

Next, the current record is removed from the linked list. If another record remains in the current linked list, make the next record in the list the current record (322). For any requests received during processing of the linked list, or anytime thereafter, handle the new requests according to step 300 et sequence (324), as indicated by arrow 325.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. For use in a system having multiple processors in a processing node coupled to a memory, a method, comprising:
   a.) receiving multiple requests for data from the multiple processors;
   b.) if ones of the multiple requests are requesting the same data, creating a respective linked list in the processing node to record the ones of the multiple requests according to order of receipt, the linked list being created without regard to types of the requests; and
   c.) issuing an oldest one of the requests recorded by each linked list from the processing node to the memory and;
   d.) receiving from the memory requests that are issued to the multiple processors requesting return of data to the memory, and if a request from memory is requesting the same data as requests recorded within a linked list, adding the memory request to the linked list.

2. The method of claim 1, and further including:
   receiving requested data from the memory;
   if the received data was requested by requests recorded in a linked list, providing the received data to a processor that issued a predetermined one of the requests included in the linked list;
   removing the predetermined request from the linked list; and
   processing all requests remaining in the linked list.

3. The method of claim 2, wherein the predetermined request is the oldest-pending request in the linked list.

4. The method of claim 2, wherein the processing step includes:
   making the next request in the linked list the current request;
   requesting return of the received data from whichever one of the multiple processors last retained the data;
   providing the received data to whichever one of the multiple processors is indicated by the current request; and
   removing the current request from the linked list.

5. The method of claim 4, wherein the memory issues memory requests to the multiple processors for the return of data to the memory, wherein a memory request requesting the same data as requests recorded by a linked list is added to the linked list, and wherein the providing step includes providing the received data to the memory if the memory is indicated by the current request.

6. The method of claim 5, wherein a shared cache is coupled to the multiple processors, and further including:
   attempting to retrieve the received data from the shared cache; and
   if, in response to the requesting step, none of the multiple processors returns the received data, the providing step includes providing any data retrieved from the shared cache to whichever one of the multiple processors or the memory is indicated by the current request.

7. The method of claim 6, wherein if, in response to the requesting step, none of the multiple processors returns the received data, and if the received data is not resident in the shared cache, indicating the current request must be retried.

8. The method of claim 7, wherein the step of receiving requested data from the memory occurs before all invalidation operations are completed for the received data, and further including preventing predetermined data from being provided to the memory until predetermined invalidation operations are completed.

9. The method of claim 4, wherein the requesting and providing steps of claim 6 are performed during an indivisible operation.

10. A method of processing requests generated by requesters and provided to a memory, including:
   a.) receiving a request for data stored in the memory;
   b.) if the request is requesting the same data as another pending request that has not yet been provided from the requesters to the memory, linking the request to the other pending request without regard to types of the requests and before either of the requests is provided by the requesters to the memory;
   c.) repeating steps a.) and b.) for any additional requests issued to the memory to create multiple linked lists of requests, each respectively associated with different data;

d.) when data for a pending request is received from the memory, providing the data to a requester that issued the pending request;

e.) if the pending request is linked to another request, requesting that the data be returned by a requester indicated by the pending request so that the other linked request may be processed;

f.) providing the data to satisfy the other linked request;

g.) making the other linked request the current request;

h.) if the current request is linked to another request, requesting that the data be returned by a requester that most recently retained the data;

i.) repeating steps f.) through h.) for each of the additional requests in the linked list; and wherein at least one of steps e.) and h.) includes requesting that the data is returned with predetermined access rights that are based on a type of the current request and the linked request.

11. A method of processing requests generated by requesters and provided to a memory, including:

a.) receiving a request for data stored in the memory;

b.) if the request is requesting the same data as another pending request that has not yet been provided from the requesters to the memory, linking the request to the other pending request without regard to types of the requests and before either of the requests is provided by the requesters to the memory;

c.) repeating steps a.) and b.) for any additional requests issued to the memory to create multiple linked lists of requests, each respectively associated with different data;

d.) when data for a pending request is received from the memory, providing the data to a requester that issued the pending request;

e.) if the pending request is linked to another request, requesting that the data be returned by a requester indicated by the pending request so that the other linked request may be processed;

f.) providing the data to satisfy the other linked request;

g.) making the other linked request the current request;

h.) if the current request is linked to another request, requesting that the data be returned by a requester that most recently retained the data;

i.) repeating steps f.) through h.) for each of the additional requests in the linked list; and wherein at least one of steps e.) and h.) include requesting that the data is returned with predetermined access rights based on rights that were granted by the memory for the data.

12. The method of claim 11, wherein at least one of steps e.) and h.) is performed in a manner that is determined programmably.

13. A system for processing requests to a memory, comprising:

multiple requesters to issue requests for data; and a request tracking circuit to retain a record of each request until the request is completed, the requesting tracking circuit including:

a storage device to store linked lists, each linked list to associate a request with any other one or more requests for the same data irrespective of types of the requests so that a single request from the multiple requesters for any given data is pending within the memory at a given time; and a control circuit to receive data from the memory in response to a request that has been associated with other requests;

to provide the received data to whichever requester issued the oldest one of the associated requests for the received data as determined by information stored within the storage device;

to process each of the other associated requests for the received data in the order in which the requests were recorded by the request tracking circuit by attempting to obtain the received data from one of the multiple requesters;

to provide any obtained data to a requester that is identified by the request that is being processed; and to cause a requester to reissue a request if, during processing of a request, data requested by the request could not be obtained.

14. The system of claim 13, wherein the control circuit includes a circuit to process the request from memory by attempting to obtain the requested data, then providing any obtained data to the memory.

15. A system for processing requests to a memory, comprising:

multiple requesters to issue requests for data; and a request tracking circuit to retain a record of each request until the request is completed, the requesting tracking circuit including:

a remote tracker circuit to store a record of a request received from the memory that is requesting that same data as one or more requests recorded within the request tracking circuit;

a storage device to store linked lists, each to associate a request with any other one or more requests for the same data irrespective of types of the requests so that a single request from the multiple requesters for any given data is pending within the memory at a given time; and a control circuit to receive data from the memory in response to a request that has been associated with other requests;

to provide the received data to whichever requester issued the oldest one of the associated requests for the received data as determined by information stored within the storage device;

to process each of the other associated requests for the received data in the order in which the requests were recorded by the request tracking circuit by attempting to obtain the received data from one of the multiple requesters; and to provide any obtained data to a requester that is identified by the request that is being processed.

16. A system for processing requests to a memory, comprising:

multiple requesters to issue requests for data; and a request tracking circuit to retain a record of each request until the request is completed, the requesting tracking circuit including:

a storage device to store linked lists, each to associate a request with any other one or more requests for the same data irrespective of types of the requests so that a single request from the multiple requesters for any given data is pending within the memory at a given time; and a control circuit
- to receive data from the memory in response to a request that has been associated with other requests;
- to provide the received data to whichever requester issued the oldest one of the associated requests for the received data as determined by information stored within the storage device; and
- to process each of the other associated requests for the received data in the order in which the requests were recorded by the request tracking circuit;

wherein the memory provides data to the request tracking circuit before all invalidation operations for the data have been completed, and wherein the request tracking circuit includes a circuit to prevent predetermined data retained by predetermined ones of the multiple requesters from being returned to the memory before all of the invalidation operations are completed.

17. A data processing system comprising:

a memory;

a processing node coupled to the memory and having multiple processors to generate requests for data to the memory, wherein the processing node includes a requesting tracking circuit to associate requests issued for the same data irrespective of request types, and to allow only one of the requests for the same data from being issued to the memory at a given time; and a control circuit included in the processing node to receive data returned from the memory, to provide the data to the processor associated with the oldest request pending for the data, to determine whether other requests are pending for the received data, and for each of the other pending requests, to process the pending requests in order of receipt by attempting to obtain the data from whichever of the multiple processors last retained the data, and to then provide any obtained data to a processor that is associated with the request being processed, the control circuit further to store programmable data to indicate the manner in which the data is to be obtained from a processor based on access rights retained by the processor for the data and the access rights requested by the processor associated with the request being processed.

18. A system for processing requests to a memory, including:

processing means for originating the requests to the memory; and request tracking means for receiving the requests, and for forming an association between any of the requests that are requesting the same data irrespective of types of the requests, the association between requests recording an order of receipt of the requests, and for allowing only one of the associated requests to be provided from the processing means to the memory; and control means included in the request tracking means for receiving data from the memory along with access rights required to process the request, and if the received data was requested by associated requests that are requesting the same data, for processing each of the associated requests in the order in which the requests were received by providing the data to the processing means along with the required access rights.

* * * * *